United States Patent Office 2,994,979
Patented Aug. 8, 1961

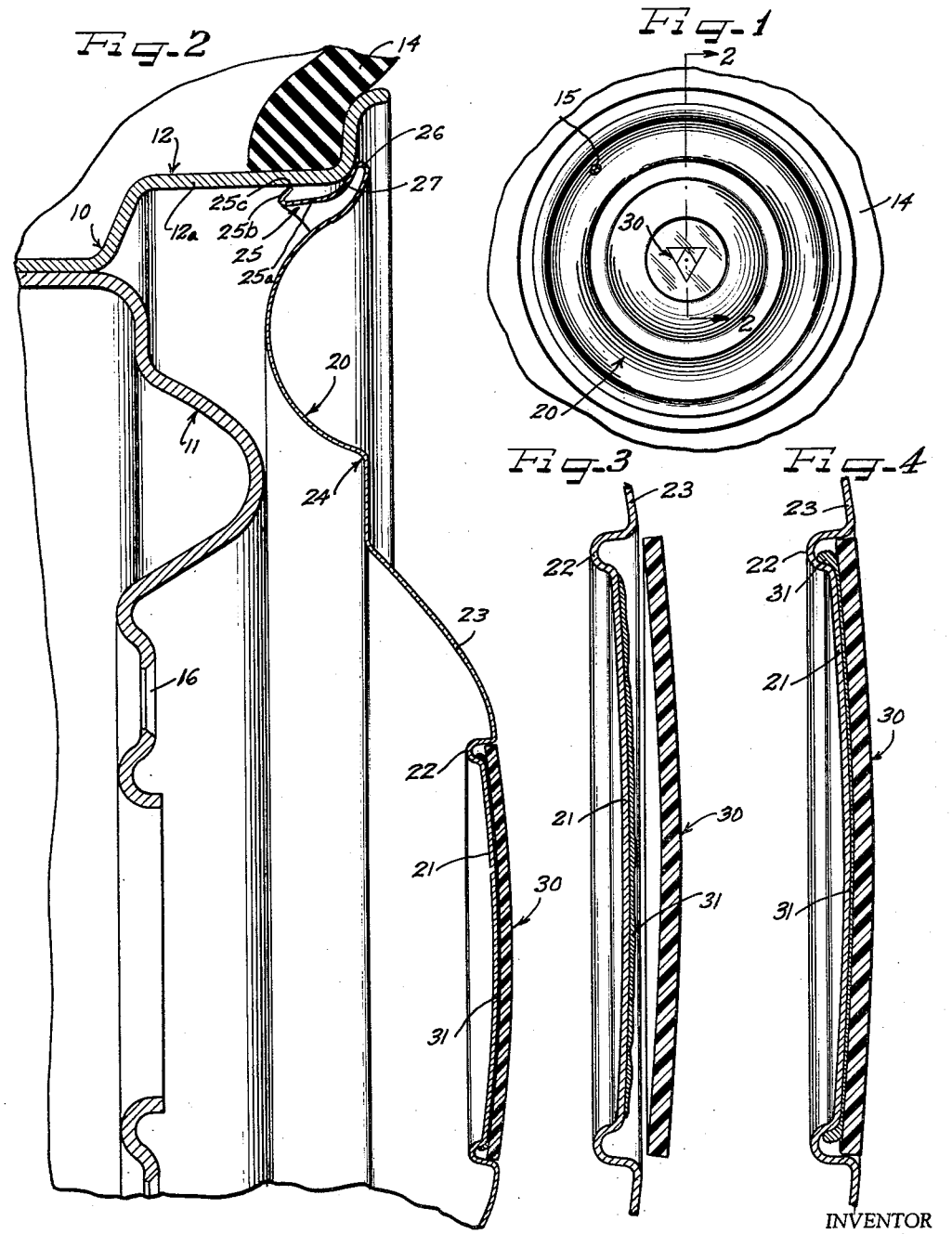

2,994,979
MEDALLION TYPE WHEEL COVER
AND METHOD
John V. Shoemaker, Detroit, Mich., assignor to Lyon Incorporated, Detroit, Mich., a corporation of Delaware
Filed May 6, 1960, Ser. No. 27,342
8 Claims. (Cl. 40—129)

This invention relates generally to wheel structures and more particularly to a wheel cover which is adapted to be retained on the vehicle wheel with the wheel cover functioning to ornament and protect the wheel.

In accordance with the present invention, a new type of wheel cover has been developed for attachment to the outer side of a vehicle wheel. This wheel cover has means on it to retain the cover on the wheel as a consequence of the engagement of fingers with the tire rim. Disposed centrally of the wheel cover, is a slightly depressed central cover area which is peripherally bounded or defined by a depressed annular axially outwardly opening sump. Bonding material or glue is carried on the central cover portion and a medallion is held in assembly with the central cover portion by means of the bonding material.

When the medallion is secured to the central cover portion, the excess bonding material is allowed to accumulate in the sump so that none of the bonding material will run over onto an external surface of the cover or onto the medallion. By providing a sump for the accumulation of the excess bonding material, time may be saved in the manufacture of the wheel cover for the number of operations to manufacture the wheel cover may be kept to a minimum. If the sump is not provided, there is a tendency for the bonding material to ooze out from underneath the medallion onto the medallion or onto the area of the cover surrounding the medallion and the finish of the cover will then be marred. When the bonding material oozes onto the cover at the periphery of the medallion or onto the medallion the bonding material must be wiped off which slows down the manufacturing operation where each piece must be individually wiped. Certain types of bonding material, even when they are immediately wiped from the cover, may tend to leave a residue which is difficult to remove without having to again polish the cover.

An important object of the present invention is to provide a medallion type of wheel cover which may be economically manufactured on a large production basis at the lowest possible cost.

Still another object of the present invention is to provide a new and improved method of forming a wheel cover having a medallion.

Yet another important object of the present invention is to provide a new and improved medallion-type wheel cover.

According to the general features of the present invention there is provided a wheel cover having a central cover portion, the central cover portion having a depressed annular axially outwardly opening sump, bonding material carried on the central cover portion, and a medallion held in assembly with the central cover portion by means of said bonding material, the sump having an excess quantity of the bonding material disposed therein.

According to still other features of the present invention, the medallion has an outer margin lapped over the sump to conceal the sump as well as the bonding material contained therein.

According to still other features of the present invention there is provided a new method for forming a wheel cover by working a mass of material into a vehicle wheel cover while contemporaneously forming a depressed annular axially outwardly opening sump on a central cover portion, applying a bonding material to an outer side of a central area of the central cover portion enclosed by the depressed annular axially outwardly opening sump, centering a medallion with respect to the central area enclosed by the depressed annular axially outwardly opening sump and engaging the medallion against the bonding material carried by the central area to assemble the medallion with the cover, and applying a force against the medallion to cause it to lie relatively flat against the central area and to cause the excess bonding material to flow into the depressed annular axially outwardly opening sump to avoid having to repolish or remove the excess bonding material from the cover at the periphery of the medallion after the medallion has been secured to the cover.

Other objects and features of the present invention will more fully become apparent in view of the following detailed description taken in conjunction with the accompanying drawings illustrating therein a single embodiment, and in which:

FIGURE 1 is a front elevation of a wheel structure according to the principles of the present invention;

FIGURE 2 is an enlarged fragmentary cross-sectional view taken substantially on the line 2—2 looking in the direction indicated by the arrows, as seen in FIGURE 1;

FIGURE 3 is an enlarged fragmentary cross-sectional view showing the manner in which a medallion may be attached to a wheel cover; according to the principles of the present invention; and FIGURE 4 is an enlarged fragmentary cross-sectional view similar to FIGURE 3 only showing the medallion attached to the wheel cover.

As shown on the drawings:

The reference numeral 10 indicates my wheel structure which includes a body part 11. The body part 11 is suitably secured to a multi-flanged drop center type of the tire rim 12 by means of welding or the like. The tire rim 12 includes a generally axially extending intermediate tire rim flange 12a. Carried upon the tire rim is a conventional pneumatic tire assembly 14 which may be either of the tube or tubeless type and is adapted to be inflated by inserting air into a valve stem 15 (FIGURE 1).

The wheel and more particularly the body part 11 lends itself to being clamped to the axle of an automobile vehicle or the like by inserting lugs affixed to the axle through body part openings 16 and thereafter threading nuts onto the lugs to clamp the body part to the axle, in a conventional manner.

According to the present invention, a new and improved medallion-type wheel cover 20 has been developed. This cover may be made from any suitable material such as spring steel and the like.

The wheel cover 20 has a central cover portion indicated generally at 21. The central cover portion 21 is peripherally bounded by a depressed annular axially outwardly opening generally C-shaped annular rib or sump 22. The sump 22 is peripherally bounded by a ring-like cover portion 23 which in turn is connected to an outer cover margin indicated generally at 24.

In order to secure the cover 20 on the wheel three or four or a suitable number of circumferentially spaced resiliently deflectable retaining fingers 25 are secured to the cover. The fingers, as illustrated, are formed integral with the cover and comprise integral underturned extensions which emanate from the outer margin of the cover. The cover 20 is underturned at 26 and provided with an annular ring-like stiffening flange 27. The fingers 25 are secured to the flange 27.

Each of the fingers includes an axially elongated resiliently deflectable leg 25a and a return bent generally short stiff radially and axially outwardly extending leg 25b which terminates in a rim engaging edge 25c. The diameter of the edges 25c is normally slightly in excess of the diameter of the inside surface of the intermediate rim flange 12a so that when the cover is applied to the wheel, the fingers will be caused to deflect radially inwardly so that the edges 25c of the fingers may bite into the intermediate rim flange and thereby sustain the cover on the wheel. To remove the cover from the wheel a suitable pry-off tool may be worked underneath the cover flange 27 and the rim engaging edges 25c and the edges 25c may be progressively worked free of the intermediate rim flange 12a by applying a suitable pry-off force to the tool.

Attached to the central cover portion 21 is a medallion 30 which may be formed of any suitable material of a type that will ornament the wheel, such as Plexiglas which is an acrylic resin. The material may be a metal, a plastic or synthetic rubber, and the like.

To manufacture the wheel cover, a mass of material which may preferably comprise a sheet metal blank is worked in such a way that the central cover portion and the sump 22 are depressed slightly axially inwardly with respect to one another and with respect to the ring-like cover portion 23 which peripherally bounds the sump. If the cover is to be formed from a metal, such as stainless steel, the blank will be shaped to form more or less at the same time that the central cover portion 21 and the sump 22. If desired, the cover may be provided with the integral retaining fingers 25 although any other suitable means may be used to sustain the cover on the wheel.

In accordance with the customary technique followed in the manufacture of metallic wheel covers, the blank is formed to shape and then if retaining fingers are to be formed integral with the cover, they are progressively worked to final shape. Then the cover is cleaned and polished.

In accordance with the present method, the medallion 30 may be attached to the cover 20 either before or after the cover 30 has been polished. A suitable bonding material 31 such as an epoxy resin type glue may be used to secure the medallion 30 to the cover. After the cover has been formed to shape the bonding material 31 is applied to the central cover portion 21. This operation may be carried out in any suitable way either automatically as part of a machine operation or manually. In either case, the bonding material 31 is spread on to the central cover portion and the medallion is then centered with respect to the central cover portion and moved into engagement with the bonding material to secure the medallion in assembly with the cover. A force is then applied against the medallion, such as by a machine or manually operated roller, to cause the medallion to lie relatively flat against the central cover area 21. As the roller is moved across the medallion, the excess bonding material is caused to flow into the depressed annular axially outwardly opening sump 22 in such a way that none of the material will flow onto the medallion 30 or onto the outer surface of the cover, such as on the outer surface of the ring-like cover portion 23.

It will be understood that modifications and variations may be effected without departing from the scope of the novel concepts of the present invention.

I claim as my invention:

1. In a wheel structure, a wheel including a multi-flanged drop center type of tire rim having an intermediate generally axially outwardly extending rim flange, a vehicle wheel cover for overlying disposition on the wheel, the cover having its outer margin provided with circumferentially spaced resiliently deflectable cover retaining fingers, the fingers each having an axially extending relatively elongated axial leg and a short stiff return bent leg overlying the axial leg and with the return bent leg terminating in a rim engaging edge, the rim engaging edges being disposed in a common circle and having a diameter slightly in excess of an inside diameter of the intermediate rim flange enabling the rim engaging edges to sustain the cover in assembly with the wheel, a medallion carried on a central crown portion of the cover by means of an adhesive, the central crown portion being peripherally bounded by an adhesive sump which is concealed by the medallion and in which adhesive is lodged.

2. An article of manufacture comprising a wheel cover, the wheel cover having a central cover portion, the central cover portion having a depressed annular axially outwardly opening sump, bonding material carried on the central cover portion, and a medallion held in assembly with the central cover portion by means of said bonding material, the sump having an excess quantity of the bonding material disposed therein.

3. An article of manufacture comprising a wheel cover, the wheel cover having a central cover portion, the central cover portion having a depressed annular axially outwardly opening sump, bonding material carried on the central cover portion, and a medallion held in assembly with the central cover portion by means of said bonding material, the sump having an excess quantity of the bonding material disposed therein, said medallion having its outer margin lapped over the sump to conceal the sump as well as the bonding material contained therein.

4. An article of manufacture comprising a wheel cover, the wheel cover having a central cover portion, the central cover portion having a depressed annular axially outwardly opening sump, bonding material carried on the central cover portion, and a medallion held in assembly with the central cover portion by means of said bonding material, the sump having an excess quantity of the bonding material disposed therein, said sump comprising a generally C-shaped annular rib.

5. An article of manufacture comprising a wheel cover, the wheel cover having a central cover portion, the central cover portion having a depressed annular axially outwardly opening sump, bonding material carried on the central cover portion, and a medallion held in assembly with the central cover portion by means of said bonding material, the sump having an excess quantity of the bonding material disposed therein, the central crown portion being peripherally bounded by a ring-like portion and with the central crown portion being disposed axially inwardly of the ring-like portion with axially outer surfaces of the medallion and the ring-like portion being smooth blended together so the juncture therebetween merely comprises a thin break in an outer surface of the cover.

6. In a method of manufacturing a wheel cover for attachment to a vehicle wheel, the steps of working a sheet metal blank into a cover by causing the material of the blank to flow and providing the blank with a central cover portion having a depressed annular axially outwardly opening sump, applying a bonding material to an outer side of a central area of the central cover portion enclosed by the depressed annular axially outwardly opening sump, centering a medallion with respect to the central area enclosed by the depressed annular axially outwardly opening sump and engaging the medallion against the bonding material carried by the central area to assemble the medallion with the cover, and applying a force against the medallion to cause it to lie relatively flat against the central area and to cause the excess bonding material to flow into the depressed annular axially outwardly opening sump to avoid having to repolish or remove the excess bonding material from the cover at the periphery of the medallion after the medallion has been secured to the cover.

7. In a method of manufacturing a wheel cover for attachment to a vehicle wheel, the steps of working a mass of material into a vehicle wheel cover while contemporaneously forming a depressed annular axially outwardly opening sump on a central cover portion, applying a bonding material to an outer side of a central area of the central cover portion enclosed by the depressed annular axially outwardly opening sump, centering a medallion with respect to the central area enclosed by the depressed annular axially outwardly opening sump and engaging the medallion against the bonding material carried by the central area to assemble the medallion with the cover, and applying a force against the medallion to cause it to lie relatively flat against the central area and to cause the excess bonding material to flow into the depressed annular axially outwardly opening sump to avoid having to repolish or remove the excess bonding material from the cover at the periphery of the medallion after the medallion has been secured to the cover.

8. In a method of manufacturing a wheel cover for attachment to a vehicle wheel, the steps of working a mass of material into a vehicle wheel cover while contemporaneously forming a depressed annular axially outwardly opening sump on a central cover portion, applying a bonding material to an outer side of a central area of the central cover portion enclosed by the depressed annular axially outwardly opening sump, centering a medallion with respect to the central area enclosed by the depressed annular axially outwardly opening sump and engaging the medallion against the bonding material carried by the central area to assemble the medallion with the cover, applying a force against the medallion to cause it to lie relatively flat against the central area and to cause the excess bonding material to flow into the depressed annular axially outwardly opening sump to avoid having to repolish or remove the excess bonding material from the cover at the periphery of the medallion after the medallion has been secured to the cover, and causing an outer margin of the medallion to be smoothly blended with the cover leaving only a narrow line between the cover and the medallion and causing the medallion to overlie and conceal the sump.

No references cited.